(12) United States Patent
Effenberger

(10) Patent No.: US 8,184,640 B2
(45) Date of Patent: May 22, 2012

(54) COMPACT VIRTUAL LOCAL AREA NETWORK MAPPER FOR THE GIGABIT-PASSIVE OPTICAL NETWORK OPTICAL NETWORK MANAGEMENT AND CONTROL INTERFACE

(75) Inventor: Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 304 days.

(21) Appl. No.: 12/476,932

(22) Filed: Jun. 2, 2009

(65) Prior Publication Data

US 2009/0304386 A1    Dec. 10, 2009

Related U.S. Application Data

(60) Provisional application No. 61/059,605, filed on Jun. 6, 2008.

(51) Int. Cl.
*H04J 14/00* (2006.01)
(52) U.S. Cl. ............... 370/395.53; 370/254; 370/389; 370/392; 370/395.31; 370/408; 398/58
(58) Field of Classification Search ............... 370/235, 370/389, 392, 408; 398/58
See application file for complete search history.

(56) References Cited

U.S. PATENT DOCUMENTS

| 6,147,995 A * | 11/2000 | Dobbins et al. | 370/392 |
|---|---|---|---|
| 2003/0152075 A1 * | 8/2003 | Hawthorne et al. | 370/389 |
| 2006/0274771 A1 * | 12/2006 | Doi | 370/408 |
| 2007/0223399 A1 * | 9/2007 | Yang et al. | 370/254 |
| 2008/0052487 A1 * | 2/2008 | Akahane et al. | 711/207 |
| 2008/0279105 A1 * | 11/2008 | Absillis et al. | 370/236.2 |
| 2009/0154349 A1 * | 6/2009 | Bernard | 370/235 |

OTHER PUBLICATIONS

International Telecommunications Union Standard, ITU-T Series G: "Transmission Systems and Media, Digital Systems and Networks—Digital Sections and Digital Line System—Optical Line Systems for Local and Access Networks—Gigabit-Capable Passive Optical Networks (G-PON): ONT Management and Control Interface Specification", G.984.4, Feb. 2008.

IEEE Standard, 802.1D, "IEEE Standard for Local and Metropolitan Area Networks—Media Access Control (MAC) Bridges," IEEE Computer Society, Jun. 9, 2004.

* cited by examiner

*Primary Examiner* — Robert Wilson
*Assistant Examiner* — Mohamed Kamara
(74) *Attorney, Agent, or Firm* — Conley Rose, P.C.; Grant Rodolph; Stephen R. Loe

(57) ABSTRACT

An apparatus comprising a Virtual Local Area Network (VLAN) mapper associated with a plurality of interfaces and a plurality of ports corresponding to the interfaces, wherein the VLAN mapper is configured to direct a plurality of packets between the interfaces and the corresponding ports based on a VLAN mapping table. Also included is an apparatus comprising at least one processor configured to implement a method comprising receiving a packet via an interface, determining whether the packet is tagged, mapping the packet to a port corresponding to the interface using a mapping table if the packet is tagged, and mapping the packet to a designated port using a default marking attribute if the packet is untagged.

19 Claims, 6 Drawing Sheets

COMPACT VIRTUAL LOCAL AREA NETWORK MAPPER FOR THE GIGABIT-PASSIVE OPTICAL NETWORK OPTICAL NETWORK MANAGEMENT AND CONTROL INTERFACE

CROSS-REFERENCE TO RELATED APPLICATIONS

The present application claims priority to U.S. Provisional Patent Application 61/059,605, filed Jun. 6, 2008 by Frank J. Effenberger, and entitled "Compact Virtual Local Area Network Mapper for the Gigabit-Passive Optical Network Optical Network Terminal Management and Control Interface," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multipoint (P2MP) network comprised of an optical line terminal (OLT) at the central office, an optical distribution network (ODN), and a plurality of optical network terminals (ONTs) at the customer premises. The P2MP architecture reduces the amount of fibers and/or equipment in comparison to a point-to-point (P2P) architecture, where an OLT connects directly to each ONT via a separate fiber. In some PON systems, such as Gigabit PON (GPON) systems, downstream data can be broadcasted at about 2.5 Gigabits per second (Gbps), while upstream data is transmitted at about 1.25 Gbps.

The PON system may comprise a control and management (C/M) plane that controls and manages the data transmissions. The C/M plane may comprise an embedded operation, administration, and maintenance (OAM) function and a physical layer OAM (PLOAM) function that mange a Physical Media Dependent (PMD) layer and a GPON Transmission Convergence (GTC) layer. Additionally, the C/M plane may comprise an ONT management and control interface (OMCI) that manages higher layers.

SUMMARY

In one embodiment, the disclosure includes an apparatus comprising a Virtual Local Area Network (VLAN) mapper associated with a plurality of interfaces and a plurality of ports corresponding to the interfaces, wherein the VLAN mapper is configured to direct a plurality of packets between the interfaces and the corresponding ports based on a VLAN mapping table.

In another embodiment, the disclosure includes an apparatus comprising at least one processor configured to implement a method comprising receiving a packet via an interface, determining whether the packet is tagged, mapping the packet to a port corresponding to the interface using a mapping table if the packet is tagged, and mapping the packet to a designated port using a default marking attribute if the packet is untagged.

In yet another embodiment, the disclosure includes a method comprising mapping a plurality of packets between a plurality of Ethernet interfaces and a plurality of corresponding Gigabit Passive Optical Network Encapsulation Method (GEM) ports based on a VLAN mapping table and a VLAN mapping model.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
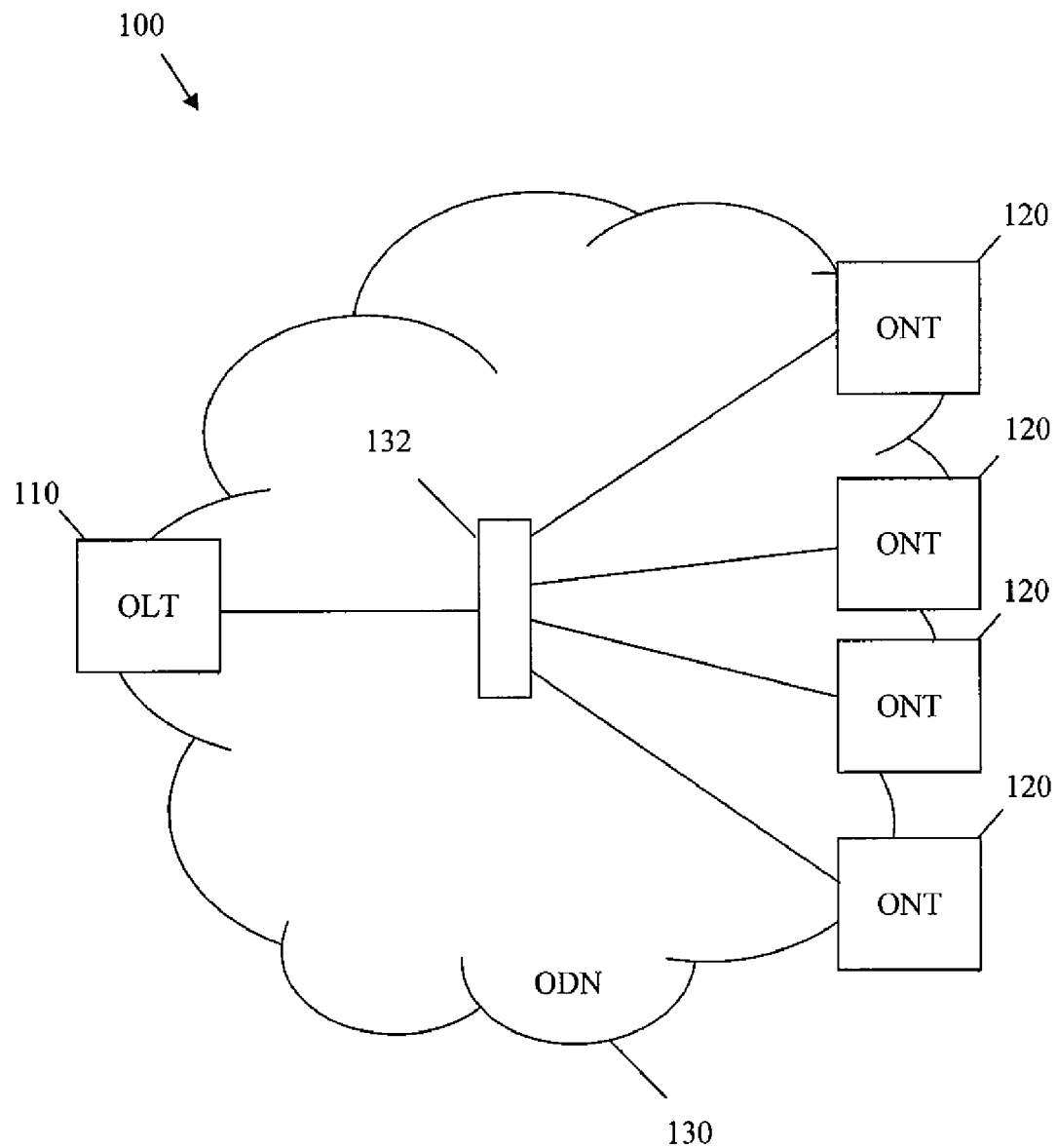
FIG. 1 is a schematic diagram of an embodiment of a PON.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The OMCI may be used to manage one or more service defining layers. Specifically, the OMCI may model data flow between the OLT and the ONTs using a protocol-independent management information base (MIB) comprising a plurality of managed entities (MEs). Such a configuration is described in the OMCI for GPON, International Telecommunication Union (ITU-T) publication G.984.4, which is incorporated by reference as if reproduced in its entirety. In the OMCI, the customer packets may be mapped to GEM ports using VLAN filtering as described in Institute of Electrical and Electronics Engineers (IEEE) 802.1p, which is also incorporated herein by reference as if reproduced in its entirety.

For G.984.4 OMCI VLAN filtering, the VLAN mapping model may comprise a plurality of MEs. Specifically, G.984.4 OMCI MEs may comprise a media access control (MAC) bridge service profile ME, and for each interface a first MAC bridge port configuration data ME and a second MAC bridge port configuration data ME, each associated with the MAC bridge service profile ME. Each of the first MAC bridge port configuration data ME and second MAC bridge configuration data ME may also be associated with a corresponding VLAN tagging filter ME. Additionally, the MEs may comprise a GEM interworking termination point (TP) ME, a physical path termination point (PPTP) Ethernet user network interface (UNI) ME, and an extended VLAN tag operation configuration data ME. The GEM interworking TP ME may be associated with the second MAC bridge port configuration data ME and a GEM port network connection termination point (CTP). The PPTP Ethernet UNI ME may be associated with the extended VLAN tag operation configuration data ME and the first MAC bridge port configuration data ME.

The MAC bridge service profile ME may provide the functionalities of a MAC bridge, e.g. facilitating packet flow between the different Ethernet interfaces and their corresponding GEM ports. As packets are received and processed at the PPTP Ethernet UNI ME, the extended VLAN tagging operation configuration data ME may specify the VLAN tagging operation for the packets, including transparent packet transmission regardless of the packet's VLAN tag or VLAN ID (VID) and/or modifying the tag control information (TCI) field in the packet. The extended VLAN tagging operation configuration data ME may also specify two layers of tags for encapsulating the packets. The first MAC bridge port configuration data ME may provide the functionalities for a first port of the MAC bridge, which may be configured for handling packets corresponding to one Ethernet interface and communicated via the PPTP Ethernet UNI ME. The first MAC bridge port configuration data ME may use the corresponding VLAN tagging filter ME to filter the packets based on VLAN tagging. The second MAC bridge port configuration data ME may provide the functionalities for a second port of the MAC bridge, which may be configured for handling packets communicated with the GEM port network CTP that corresponds to the Ethernet interface. The second MAC bridge port configuration data ME may also use the corresponding VLAN tagging filter ME to filter the communicated packets based on VLAN tagging. The GEM interworking TP ME may indicate to the MAC bridge service profile and/or the second MAC bridge port configuration data ME the points where GEM packets may be generated or converted into bit streams.

The G.984.4 mapping model may require numerous MEs to be configured. The number of MEs that need to be configured may be greater than or equal to about 2N+2, where N is the number of interfaces at the ONT. Ambiguities within G.984.4 may cause variations in the MEs between different ONT vendors, which may cause interoperability problems in deployed PON systems. Further, since the number of MEs depends on the quantity of interfaces at the ONT, the complexity of the model and the interoperability problems may increase as more interfaces are established. Therefore, it may be advantageous to simplify the OMCI by using an improved VLAN mapping model that has similar functionalities and fewer MEs, and that is independent from the quantity of interfaces at the ONT.

Disclosed herein is a system and method for providing an improved VLAN mapping model for an OMCI. The improved VLAN mapping model may comprise fewer MEs than other OMCI VLAN mapping models, which may reduce model complexity and improve interoperability. Specifically, the improved VLAN mapping model may comprise a VLAN mapper service profile ME, which may replace a plurality of MEs in the other OMCI VLAN mapping models. The VLAN mapper service profile may comprise a mapping table that maps frames or packets comprising VIDs and a default marking attribute that maps packets that do not comprise VIDs or VLAN tags. The number of MEs in the improved VLAN mapping model may be independent of the quantity of interfaces in the PON system. Hence, the PON system may be expanded by adding more ONTs without substantially increasing the complexity of the OMCI or reducing its interoperability.

FIG. 1 illustrates one embodiment of a PON 100. The PON 100 may comprise an OLT 110, a plurality of ONTs 120, and an ODN 130 that couples the OLT 110 to the ONTs 120. The PON 100 may be a communications network that does not require any active components to distribute data between the OLT 110 and the ONTs 120. Instead, the PON 100 may use the passive optical components in the ODN 130 to distribute data between the OLT 110 and the ONTs 120. The PON 100 may be next generation access (NGA) system, such as ten Gbps GPON (or XGPON), which may have a downstream bandwidth of about ten Gbps and an upstream bandwidth of at least about 2.5 Gbps. Other examples of suitable PONs 100 include the asynchronous transfer mode PON (APON) and the broadband PON (BPON) defined by ITU-T G.983, the GPON defined by ITU-T G.984, the Ethernet PON (EPON) defined by IEEE 802.3ah, and the Wavelength Division Multiplexed (WDM) PON (WPON), all of which are incorporated herein by reference as if reproduced in their entirety.

In an embodiment, the OLT 110 may be any device that is configured to communicate with the ONTs 120 and another network (not shown). Specifically, the OLT 110 may act as an intermediary between the other network and the ONTs 120. For instance, the OLT 110 may forward data received from the network to the ONTs 120, and forward data received from the ONTs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONTs 120 may be any devices that are configured to communicate with the OLT 110 and a customer or user (not shown). Specifically, the ONTs 120 may act as an intermediary between the OLT 110 and the customer. For instance, the ONTs 120 may forward data received from the OLT 110 to the customer, and forward data received from the customer onto the OLT 110. Although the specific configuration of the ONTs 120 may vary depending on the type of PON 100, in an embodiment, the ONTs 120 may comprise an optical transmitter configured to send optical signals to the OLT 110 and an optical receiver configured to receive optical signals from the OLT 110. Additionally, the ONTs 120 may comprise a converter that converts the optical signal into electrical signals for the customer, such as signals in the Ethernet protocol, and a second transmitter and/or receiver that may send and/or receive the electrical signals to a customer device. In some embodiments, ONTs 120 and optical network units (ONUs) are similar, and thus the terms are used interchangeably herein. The ONTs 120 may be typically located at distributed locations, such as the customer premises, but may be located at other locations as well.

The ODN 130 may be a data distribution system and may comprise a splitter 132 and a plurality of fiber cables. The splitter 132 may be coupled to the OLT 110 and the ONTs 120 via the fiber cables. In an embodiment, the splitter 132 may distribute similar copies of optical signals from the OLT 110 to the ONTs 120 and combines different optical signals from the ONTs 120 to the OLT 110. Alternatively or additionally, the ODN 130 may comprise a plurality of splitters 132, couplers, distributors, optical fiber cables, and/or other equipment. The splitters 132, distributors, couplers, fiber cables, and/or other equipment may be passive optical components. Specifically, the splitters 132, distributors, couplers, fiber cables, and/or other equipment may be components that do not require any power to distribute data signals between the OLT 110 and the ONTs 120. Alternatively, the ODN 130 may comprise one or a plurality of processing equipment, such as optical amplifiers. The ODN 130 may typically extend from the OLT 110 to the ONTs 120 in a branching configuration as shown in FIG. 1, but may be alternatively configured in any other P2MP configurations.

Figure 2:
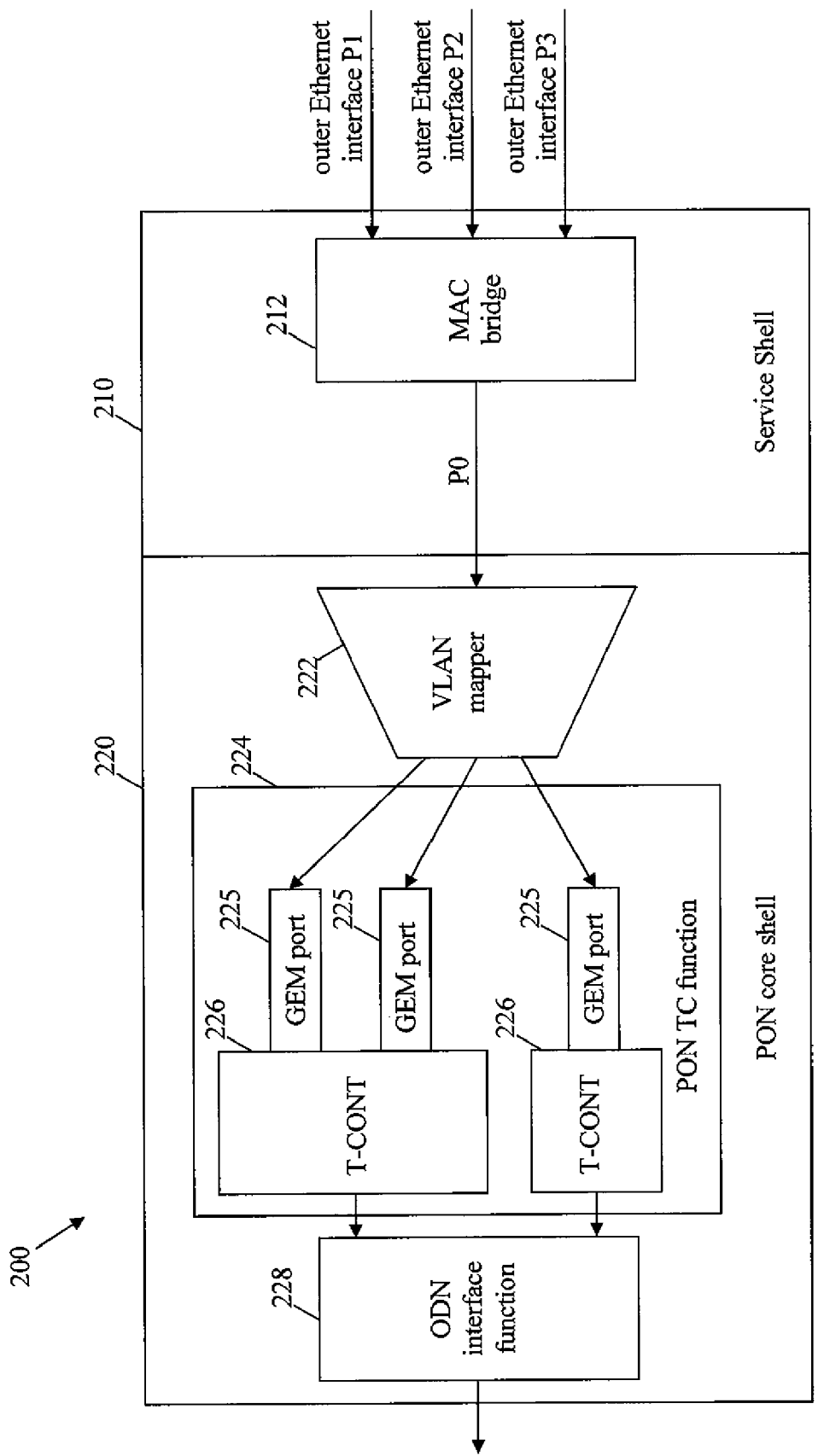
FIG. 2 is a schematic diagram of an embodiment of an ONT model.

FIG. 2 illustrates an embodiment of the ONT model 200, which may use the OMCI VLAN filtering feature to direct traffic within the ONT model 200. The ONT model 200 may comprise a plurality of functional blocks, which may be embodied as software and/or hardware components. The functional blocks may comprise a service shell 210 and a PON core shell 220. The service shell 210 may be configured to receive a plurality of data streams via a plurality of outer interfaces, such as outer Ethernet interfaces P1, P2, and P3, which may be coupled to external nodes or networks. Although three outer Ethernet interfaces are shown in FIG. 2, the service shell 210 may receive data from any number of interfaces. The service shell 210 may forward the received data to the PON core shell 220 via an inner interface, such as an inner Ethernet interface P0. The PON core shell 220 may be configured to receive the packets from the service shell 210, map the packets based on the VLAN mapping model, encapsulate the packets, for instance into GEM packets, and forward the encapsulated packets to the ODN.

In an embodiment, the service shell 210 may comprise a MAC bridge 212, which may receive frames or packets via the outer Ethernet interfaces P1, P2, and P3, process the packets, and forward the processed packets via the inner interface P0. The MAC bridge 212 may obtain the MAC addresses in the packets, the packet types, other packet information, or combinations thereof and process the packets based on such information. For instance, the MAC bridge 212 may modify, add, and/or delete labels in the packets at the Open Systems Interconnection (OSI) Layer 2. The MAC bridge 212 may then forward the processed packets to the PON core shell 220.

In an embodiment, the PON core shell 220 may comprise a VLAN mapper 222, a PON Transmission Container (TC) function 224, and an ODN interface function 228. The VLAN mapper 222 may receive the frames or packets from the MAC bridge 212, separate the packets, and forward the packets to the appropriate PON TC function 224. Specifically, the VLAN mapper 222 may map the packets from the outer Ethernet interfaces to their corresponding ports in the PON TC function 224 using a table as described below, and forward the packets to the GEM port 225 identified in the table. If necessary, the VLAN mapper 222 may tag untagged frames, e.g. with a VID, prior to mapping and forwarding the frames.

The PON TC function 224 may encapsulate the packets and forward the encapsulated packets to the ODN interface function 228. In a specific embodiment, the PON TC function 224 may comprise a plurality of GEM ports 225 and a plurality of Transmission Containers (T-CONTs) 226. The GEM ports 225 may correspond to the outer interfaces (e.g., outer Ethernet interfaces P1, P2, P3), where each port may insert or encapsulate the packets' content of the corresponding interface into a GEM frame format. The GEM ports 225 may then send the GEM packets to the T-CONTs 226. Each T-CONT 226 may be coupled to at least one GEM port 225, may receive the GEM packets from the port(s), and forward the GEM packets to the ODN interface function 228. Additionally, the T-CONTs 226 may manage upstream bandwidth allocation in the GTC layer. Specifically, the T-CONTs 226 may be a transport entity in the GTC layer that may be configured to transfer higher-layer information, for instance between the OLT and the ONT model 200. The ODN interface function 228 may receive the GEM packets from the T-CONTs 226 and forward the packets to the ODN, which may in turn carry the GEM packets to the OLT.

Figure 3:
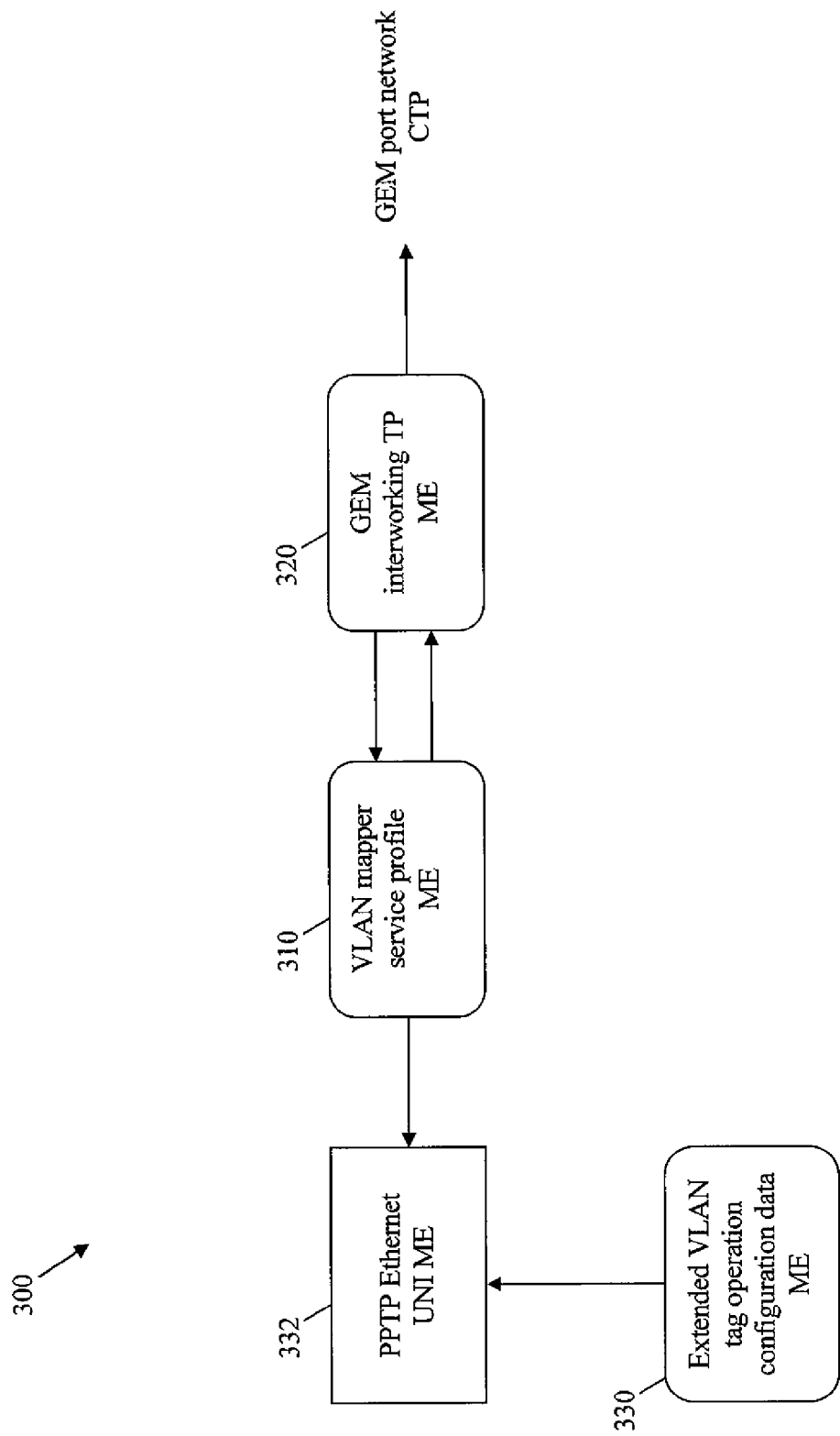
FIG. 3 is a schematic diagram of an embodiment of a VLAN mapping model.

FIG. 3 illustrates an embodiment of a VLAN mapping model 300, which may be used by the VLAN mapper 222 to map the Ethernet packets at different interfaces to their corresponding GEM ports at the ONT. The VLAN mapping model 300 may comprise fewer MEs than the MEs used for the G.984.4 OMCI. Specifically, the MEs may comprise a VLAN mapper service profile ME 310, a GEM interworking TP ME 320, an extended VLAN tag operation configuration data ME 330, and a PPTP Ethernet UNI ME 332. The GEM interworking TP ME 320 may be associated with the VLAN mapper service profile ME 310 and a GEM port network CTP. The extended VLAN tag operation configuration data ME 330 may be associated with the PPTP Ethernet user network interface UNI ME 332, which may also be associated with the VLAN mapper service profile ME 310. Accordingly, the VLAN mapper service profile ME 310 may replace the five MEs used in the G.984.4 OMCI VLAN mapping model. The MEs may be configured using software (or firmware), for instance at a single hardware component or at a plurality of coupled hardware components.

The GEM interworking TP ME 320, the extended VLAN tag operation configuration data ME 330, and the PPTP Ethernet UNI ME 332 may have similar functionalities as the GEM interworking TP ME, the extended VLAN tag operation configuration data ME, and the PPTP Ethernet UNI ME, respectively, described in G.984.4. The VLAN mapper service profile ME 310 may have similar functionalities as the MAC bridge service profile ME, the MAC bridge port configuration data MEs, and the VLAN tagging filter MEs described in G.984.4. However, the VLAN mapper service profile ME 310 may have additional functionalities as described below.

In an embodiment, the VLAN mapper service profile ME 310 may have at least two functionalities not disclosed in G.984.4. First, the VLAN mapper service profile ME 310 may maintain a mapping table that correlates tagged frames or packets comprising VLAN tags or VIDs, e.g. Ethernet packets, to their corresponding ports, e.g. GEM ports. Second, the VLAN mapper service profile ME 310 may maintain a default marking attribute for mapping untagged packets, which may not have VLAN tags or VIDs to a designated port. The VLAN mapper service profile ME 310 for each ONT in the PON may use a different mapping table and a default marking attribute. Alternatively, the VLAN mapper service profile ME 310 for each ONT in the PON may use the same mapping table and marking default attribute. In either case, the VLAN mapper service profile ME 310 may add new entries to the mapping table and/or the default marking attribute if new ports are established, rather than creating new MEs. As such, the number of MEs in the VLAN mapping model 300 may remain unchanged and the VLAN mapping model 300 may be independent of the quantity of interfaces in the PON system.

Figure 4:
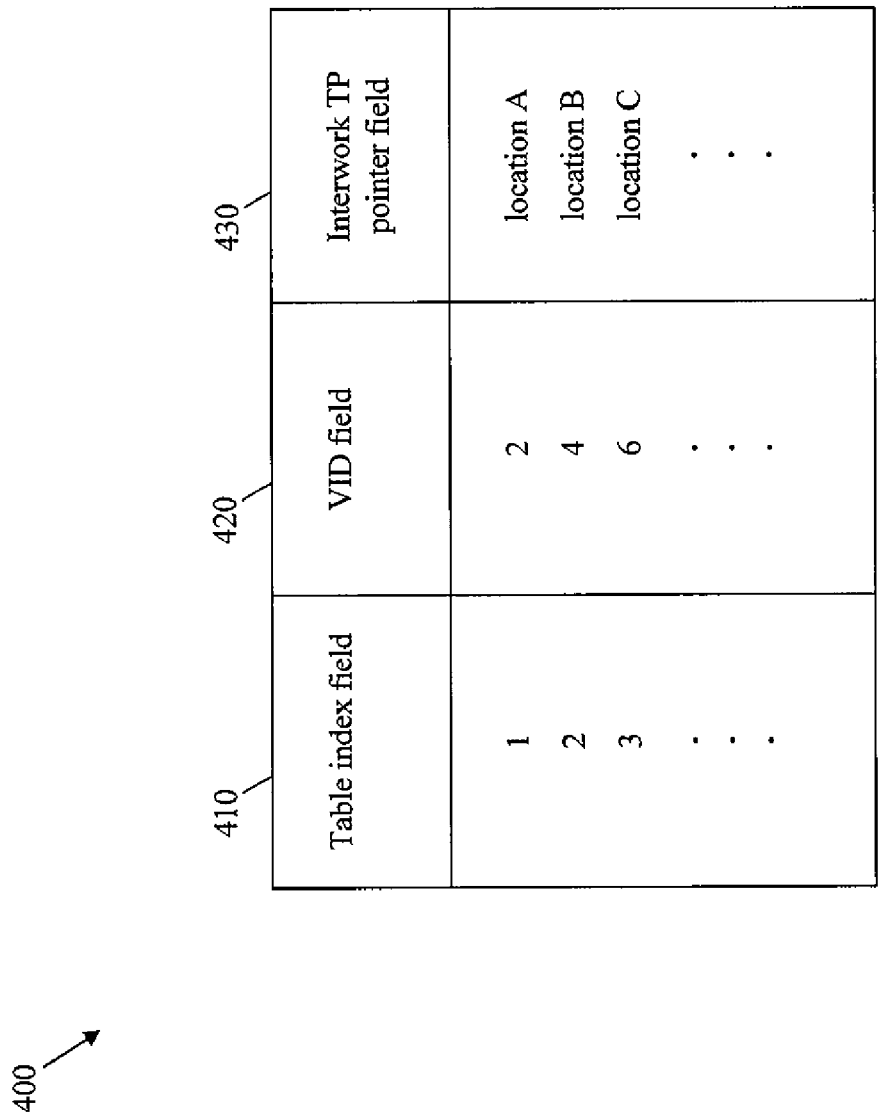
FIG. 4 is a schematic diagram of an embodiment of a mapping table.

FIG. 4 illustrates an embodiment of a mapping table 400, which may be accessed and maintained, for instance using the VLAN mapper service profile 310, to map the Ethernet packets from different interfaces to their corresponding GEM ports. Specifically, the mapping table 400 may associate the packets with the GEM ports based on their VLAN tags or VIDs. The mapping table may comprise at least one table index field 410, a VID field 420 associated with table index field 410, and an interwork TP pointer field 430 associated with the VID field 420. The table index field 410 may indicate the sequence of the entry in the table. Alternatively, the table index field 410 may be unique for each entry and may be used for operating and maintaining the mapping table 400. The table index 410 may also comprise an operation type, such as add or delete operations. The VID field 420 may comprise a VID (or tag) associated with one of the interfaces, which may also be included in the packets from that interface. The interwork TP pointer field 430 may specify a GEM interworking TP ME, such as the GEM interworking TP ME 320 described above, which may be in communication with a GEM port network CTP corresponding to the VID in the VID field 420. As such, the mapping table 400 provides a pointer to the GEM interworking TP ME associated with each VID.

Additionally, some of the packets may be mapped using the default marking attribute. Specifically, the default marking attribute may be accessed and maintained to map the untagged packets from at least one interface to at least one designated GEM port. The default marking attribute may specify how to handle the untagged packets or packets having unrecognized tags or IDs at the ONT. In an embodiment, the default marking attribute may comprise a default VID setting for handling such packets. The default VID setting may specify a VID, which may be assigned to the untagged packets. The default VID may be associated with a designated GEM port, which may correspond to the interface of the untagged packets. For instance, the mapping table 400 may associate the default VID with an interwork TP pointer in communication with the designated GEM port.

Figure 5:
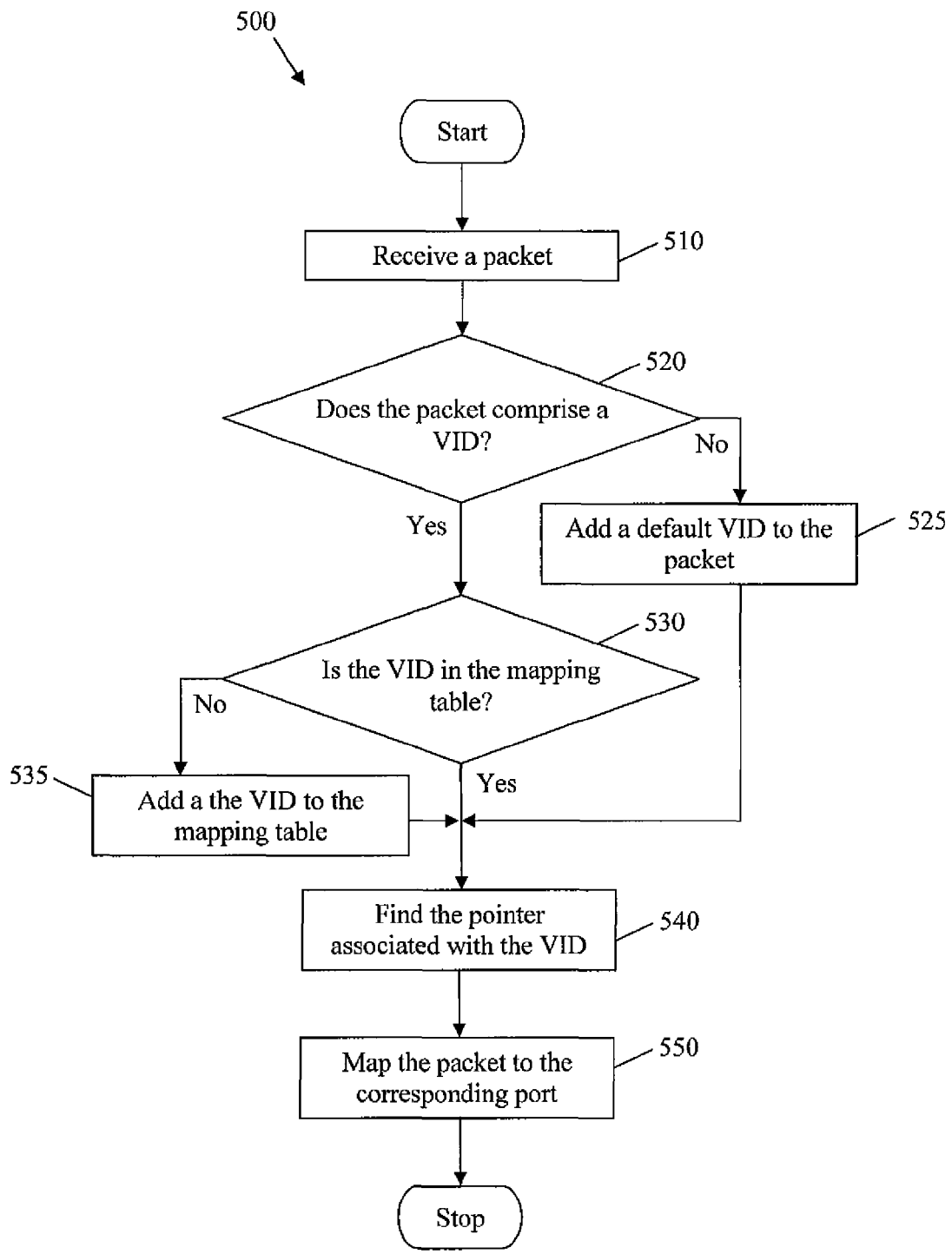
FIG. 5 is a flowchart of an embodiment of a VLAN mapping method.

FIG. 5 illustrates an embodiment of a VLAN mapping method 500, which may be used to map the packets of different Ethernet interfaces to their corresponding GEM ports at the ONT. For example, the VLAN mapping method 500 may be implemented using the VLAN mapper service profile ME 310 in the VLAN mapper 222 at the ONT 120 to map both the tagged packets and the untagged packets from the different outer Ethernet interfaces. The VLAN mapping method 500 may begin at block 510, where a packet may be received at one of the outer Ethernet interfaces. At block 520, the VLAN mapping method 500 may determine whether the packet comprises a VID or a VLAN tag. The VLAN mapping method 500 may proceed to block 525 if the condition in block 520 is not met. At block 525, the VLAN mapping method 500 may add a default VID to the packet, which may be associated with a GEM port designated for the untagged packets. The VID may also be added to a mapping table, such as the mapping table 400, and associated to an interwork TP pointer that indicates the GEM port. The VLAN mapping method 500 may then proceed to block 540.

Alternatively, if the condition in block 520 is met, the VLAN mapping method 500 may proceed to block 530. At block 530, the VLAN mapping method 500 may determine whether the VID (or tag) in the packet is found in the mapping table. If the VID is not found in the mapping table, the VLAN mapping method 500 may proceed to block 535. At block 535, the VLAN mapping method 500 may add the VID to the mapping table. For instance, the VID may be associated with an interwork TP pointer that indicates a GEM port, which may also be added to the mapping table. As such, the added VID may be mapped to one of the GEM ports corresponding to the Ethernet interface of the packet or to a GEM port designated for packets with unrecognized VIDs or tags. The VLAN mapping method 500 may then proceed to block 540. Alternatively, if the VID is found in the mapping table at block 530, the VLAN mapping method 500 may proceed to block 540.

At block 540, the VLAN mapping method 500 may find the pointer associated with the port associated with the VID (or tag) in the packet. For instance, the VLAN mapping method 500 may search the mapping table for an entry that matches the VID or VLAN tag and obtain the interwork TP pointer that indicates the corresponding GEM port. The VLAN mapping method 500 may then proceed to block 550. At block 550, the VLAN mapping method 500 may map the packet to the corresponding port. Hence, the packet may be forwarded to the GEM port corresponding to the outer Ethernet interface of the packet.

In an embodiment, the VLAN mapping method 500 may use the table index field in the mapping table to determine whether to map or drop a packet. For instance, the table index associated with a VID may be set to one to specify that the packets comprising the VID and corresponding to an Ethernet interface may be forwarded. Alternatively, the table index field may be set to zero or two to specify that the packets may be deleted. In an embodiment, the VLAN mapping method 500 may also be used at the ONT to direct GEM packets from the ODN to the outer Ethernet interfaces. As such, the GEM ports may also be mapped to the Ethernet interfaces for instance using the same mapping table and the same VLAN mapping model, such as the VLAN mapping model 300.

Figure 6:
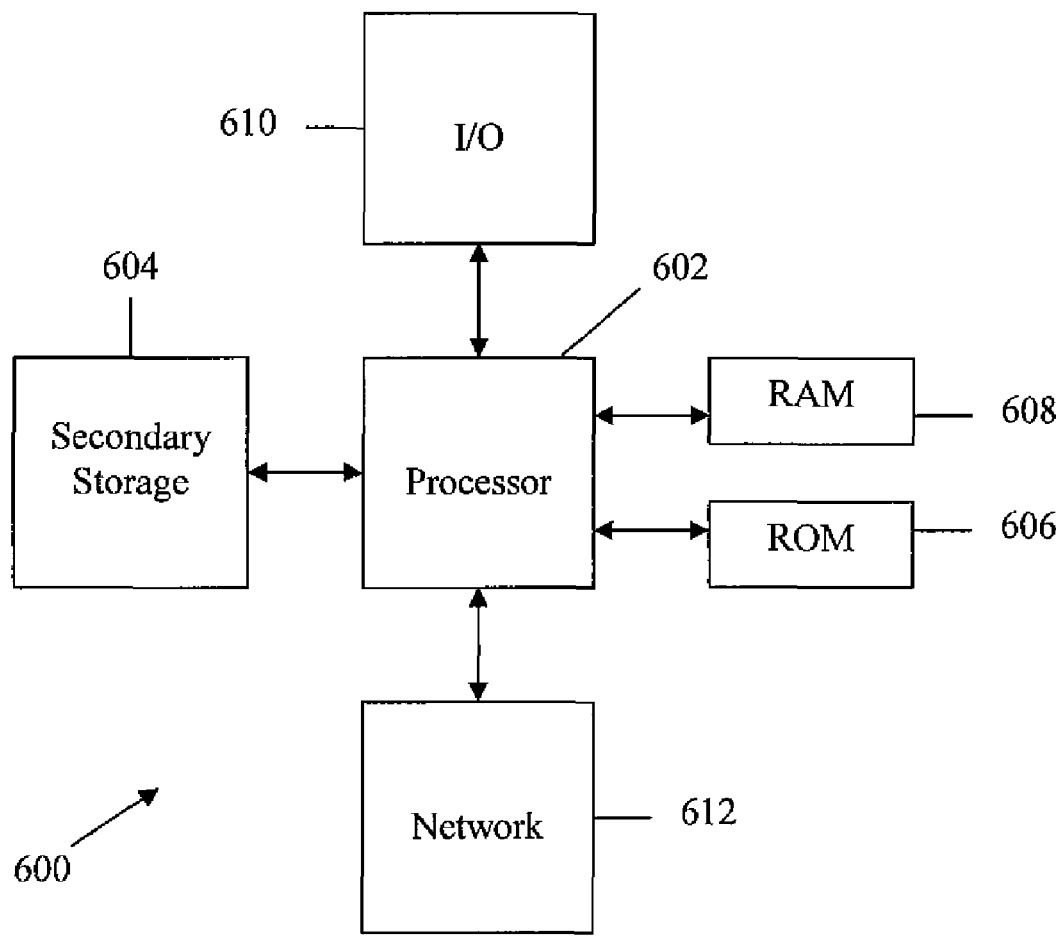
FIG. 6 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiments) and/or features of the embodiment(s) made by a person having ordinary skill in the art are within the scope of the disclosure. Alternative embodiments that result from combining, integrating, and/or omitting features of the embodiments) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
  a Virtual Local Area Network (VLAN) mapper associated with a plurality of interfaces and a plurality of ports corresponding to the interfaces,
  wherein the VLAN mapper comprises: a physical path termination point (PPTP) Ethernet user network interface (UNI) managed entity (ME); a Gigabit Passive Optical Network Encapsulation Method (GEM) interworking termination point (TP) ME; and a VLAN mapper service profile ME comprising a mapping table and positioned between the PPTP Ethernet UNI ME and the GEM interworking TP ME, and
  wherein the VLAN mapper is configured to direct a plurality of packets between the interfaces and the corresponding ports based on a VLAN mapping table,
  wherein the VLAN mapper is configured to direct a plurality of untagged packet, packets with unrecognized VLAN identifiers (VIDs), or both between the interfaces and the corresponding ports based on a default marking attribute, and
  wherein the mapping table comprises at least one table index field, a VID field associated with table index field, and an interwork TP pointer field associated with the VID field.

2. The apparatus of claim 1, wherein at least some of the packets include a VLAN identifier (VID), and wherein the VLAN mapping table associates each VID with one of the interfaces.

3. The apparatus of claim 2, wherein the mapping table comprises the VIDs and an interwork TP pointer associated with each VID, wherein the mapping table comprises a table index associated with each VID and the associated interwork TP pointer, wherein the VLAN mapping table is maintained by the VLAN mapper service profile ME, and wherein the interwork TP pointer indicates a port corresponding to the interface associated with the packets.

4. The apparatus of claim 3, wherein the table index comprises an add operation, a delete operation, or both, wherein the PPTP Ethernet UNI ME is an International Telecommunications Union Telecommunications Standardization Sector (ITU-T) G.984.4 PPTP Ethernet UNI ME, and wherein the GEM interworking TP ME is an ITU-T G.984.4 GEM interworking TP ME.

5. The apparatus of claim 1, wherein the default marking attribute comprises a default VID associated with a designated port.

6. The apparatus of claim 1, wherein the interfaces are outer Ethernet interfaces that communicate packets to customer networks or nodes, and wherein the ports are GEM ports that communicate packets to an optical line terminal (OLT) via an optical distribution network (ODN).

7. The apparatus of claim 1 further comprising:
  a Media Access Control (MAC) bridge associated with the VLAN mapper and the interfaces;
  a plurality of Transmission Containers (T-CONTs) associated with the ports; and
  an optical distribution network (ODN) interface function associated with the T-CONTs.

8. An apparatus comprising:
  at least one processor configured to:
  receive a packet via an interface;
  determine whether the packet is tagged;
  map the packet to a port corresponding to the interface using a mapping table if the packet is tagged; and
  map the packet to a designated port using a default marking attribute if the packet is untagged,
  wherein the mapping table is part of a virtual local area network (VLAN) mapper service profile managed entity (ME) positioned between a physical path termination point (PPTP) Ethernet user network interface (UNI) ME and a Gigabit Passive Optical Network Encapsulation Method (GEM) interworking termination point (TP) ME,
  wherein the VLAN mapper service is configured to direct a plurality of untagged packet, packets with unrecognized VLAN identifiers (VIDs), or both between the interfaces and the corresponding ports based on a default marking attribute, and wherein the mapping table comprises at least one table index field, a VID field associated with table index field, and an interwork TP pointer field associated with the VID field.

9. The apparatus of claim 8, wherein the packet is mapped to the port corresponding to the interface by associating a Virtual Local Area Access Network Identifier (VID) in the packet with a pointer in the mapping table that indicates the port, wherein the PPTP Ethernet UNI ME is an International Telecommunications Union Telecommunications Standardization Sector (ITU-T) G.984.4 PPTP Ethernet UNI ME, and wherein the GEM interworking TP ME is an ITU-T G.984.4 GEM interworking TP ME, and wherein the determining step and the two mapping steps are modeled within the VLAN mapper service profile ME.

10. The apparatus of claim 9, wherein the processor is further configured to:

determine whether the VID is in the mapping table; and add the VID and the pointer that indicates the port to the mapping table if the VID is not in the mapping table.

11. The apparatus of claim 9, wherein the packet is mapped to the designated port by assigning a default VID to the packet and associating the default VID with the designated port.

12. The apparatus of claim 8, wherein the processor is further configured to:

receive a packet via the port; and map the packet to the interface corresponding to the port using the mapping table.

13. A method comprising:

mapping a plurality of packets between a plurality of Ethernet interfaces and a plurality of corresponding Gigabit Passive Optical Network Encapsulation Method (GEM) ports based on a Virtual Local Area Network (VLAN) mapping table and a VLAN mapping model and based on a default marking attribute, wherein the VLAN mapping model comprises: a physical path termination point (PPTP) Ethernet user network interface (UNI) managed entity (ME); a Gigabit Passive Optical Network Encapsulation Method (GEM) interworking termination point (TP) ME; and a VLAN mapper service profile ME comprising a mapping table and positioned between the PPTP Ethernet UNI ME and the GEM interworking TP ME, and wherein the mapping table comprises at least one table index field, a VID field associated with table index field, and an interwork TP pointer field associated with the VID field.

14. The method of claim 13, wherein the quantity of MEs is substantially independent of the quantity of interfaces in the VLAN mapping model.

15. The method of claim 13, wherein the VLAN mapping model is part of an optical network terminal (ONT) management and control interface (OMCI), wherein the PPTP Ethernet UNI ME is an International Telecommunications Union Telecommunications Standardization Sector (ITU-T) 6.984.4 PPTP Ethernet UNI ME, and wherein the GEM interworking TP ME is an ITU-T 6.984.4 GEM interworking TP ME.

16. The method of claim 15, wherein mapping the packets is implemented within the ONT.

17. The apparatus of claim 1, wherein the apparatus does not comprise a media access control (MAC) bridge service profile ME as described in ITU-T G.984.4, a MAC bridge port configuration data ME as described in ITU-T G.984.4, or a VLAN tagging filter ME as described in ITU-T G.984.4.

18. The apparatus of claim 8, wherein the apparatus does not include a media access control (MAC) bridge service profile ME as described in ITU-T G.984.4, a MAC bridge port configuration data ME as described in ITU-T G.984.4, or a VLAN tagging filter ME as described in ITU-T G.984.4.

19. The method of claim 13, wherein the VLAN mapping model does not include a media access control (MAC) bridge service profile ME as described in ITU-T G.984.4, a MAC bridge port configuration data ME as described in ITU-T 6.984.4, or a VLAN tagging filter ME as described in ITU-T G.984.4.

* * * * *

UNITED STATES PATENT AND TRADEMARK OFFICE
CERTIFICATE OF CORRECTION

PATENT NO. : 8,184,640 B2  
APPLICATION NO. : 12/476932  
DATED : May 22, 2012  
INVENTOR(S) : Frank J. Effenberger Page 1 of 1

It is certified that error appears in the above-identified patent and that said Letters Patent is hereby corrected as shown below:

Face of Patent, column 1, section (54), title should read "VLAN Mapper Comprising a PPTP Ethernet UNI ME, a GEM Interworking TP ME, and a VLAN Mapper Service Profile ME Positioned Between the PPTP Ethernet UNI ME and the GEM Interworking TP ME"

Column 10, line 3, claim 3 should read "and an interwork TP pointer"

Signed and Sealed this  
Twenty-fifth Day of September, 2012

David J. Kappos  
*Director of the United States Patent and Trademark Office*

UNITED STATES PATENT AND TRADEMARK OFFICE
CERTIFICATE OF CORRECTION

PATENT NO. : 8,184,640 B2  Page 1 of 1
APPLICATION NO. : 12/476932
DATED : May 22, 2012
INVENTOR(S) : Frank J. Effenberger It is certified that error appears in the above-identified patent and that said Letters Patent is hereby corrected as shown below:

Face of Patent, column 1, section (54) and at Column 1, lines 1-5, title should read "VLAN Mapper Comprising a PPTP Ethernet UNI ME, a GEM Interworking TP ME, and a VLAN Mapper Service Profile ME Positioned Between the PPTP Ethernet UNI ME and the GEM Interworking TP ME"

Column 10, line 24 (Claim 3, line 3) should read "and an interwork TP pointer"

This certificate supersedes the Certificate of Correction issued September 25, 2012.

Signed and Sealed this
Thirtieth Day of October, 2012

David J. Kappos
*Director of the United States Patent and Trademark Office*